United States Patent [19]

Adamic et al.

[11] Patent Number: 5,431,724
[45] Date of Patent: Jul. 11, 1995

[54] LOW WATER CONTENT INKS FOR MINIMIZING WET COCKLE IN THERMAL INK-JET INKS

[75] Inventors: Raymond J. Adamic; Garold E. Radke, both of Corvallis, Oreg.

[73] Assignee: Hewlett-Packard Corporation, Palo Alto, Calif.

[21] Appl. No.: 221,230

[22] Filed: Mar. 30, 1994

[51] Int. Cl.⁶ .............................................. C09D 11/02
[52] U.S. Cl. .................................. 106/22 R; 106/22 H
[58] Field of Search ............................ 106/22 R, 22 H

[56] References Cited

U.S. PATENT DOCUMENTS

| | | | |
|---|---|---|---|
| 3,776,742 | 12/1973 | Sanders | 106/22 B |
| 4,655,834 | 8/1985 | Haruta et al. | 106/20 |
| 4,756,757 | 12/1986 | Haruta et al. | 106/20 |
| 5,059,246 | 10/1990 | Yamamoto | 106/22 |
| 5,207,824 | 5/1993 | Moffatt et al. | 106/22 R |

Primary Examiner—Helene Klemanski

[57] ABSTRACT

Wet cockle is minimized in aqueous-based, thermal ink-jet inks by adding to the ink at least one water-soluble substance, such as a solvent or salt, having a molecular weight of less than 200 grams/mole in an amount sufficient to reduce the mole fraction of water to a maximum value of about 0.5. Addition of the substance reduces wet paper cockle to a value that is less than the distance between the thermal ink-jet pen and the paper, thereby preventing a crash condition between the paper and the pen.

16 Claims, 2 Drawing Sheets

LOW WATER CONTENT INKS FOR MINIMIZING WET COCKLE IN THERMAL INK-JET INKS

TECHNICAL FIELD

The present invention relates generally to thermal ink-jet printing, and, more particularly, to the control of paper cockle which can occur during printing.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected resistor elements to heat up (resistive heating). The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of resistive heating on the ink composition.

Cockle refers to the swelling and deformation of paper while wet with ink, and also when dried. Wet cockle is defined as paper that is cockling immediately after printing; dry cockle, also called curl, is defined when the paper has dried. The main emphasis of this invention is on minimizing wet cockle.

The printhead-to-paper spacing is a specific, definite value (assuming flat, non-cockled paper), and if wet paper (cockled) swells high enough, a crash between the printhead and paper will occur and result in deleterious effects during printing, such as print quality degradation and possible printhead malfunctions. As such, minimizing cockle is of primary importance for ink-jet printing.

Without subscribing to any particular theory, it is believed that the reason paper cockles when wet is due to the absorption of water by paper fibers and breaking of interfiber bonds. This results in expansion of the paper and a series of waves that appear across the printing zone. If the amplitude of the waves is greater than the head-to-paper distance, interference will occur between the two. One approach to solving the cockle problem would be to find an "anti-cockle" additive that could be placed in the ink at low enough concentrations to minimize wet cockle without adversely affecting the performance of the pen or output. Such anti-cockle additives are disclosed and claimed in U.S. Pat. No. 5,207,824, issued May 4, 1993, and assigned to the same assignee as the present application. While this approach is certainly suitable, efforts have continued to find other solutions to the cockle problem.

A need remains for a reformulation of certain thermal ink-jet inks to avoid paper cockle.

DISCLOSURE OF INVENTION

In accordance with the invention, wet cockle is minimized in aqueous-based, thermal ink-jet inks by including at least one non-cockle agent in an amount sufficient to reduce the mole fraction of water to a maximum value of about 0.5. The non-cockle agent is one comprising a water-soluble material having a molecular weight not exceeding about 200 grams/mole.

Use of the non-cockle agent minimizes, or at least reduces, paper cockle. In particular, the method of the invention reduces the paper cockle to a level less than the spacing between the printhead and the paper.

BEST MODES FOR CARRYING OUT THE INVENTION

Typically, ink-jet inks are aqueous-based formulations and contain from 85 to 95% water (by weight), or 98 to 99% mole fraction water. Without subscribing to any particular theory, it appears that the water causes the cellulose fibers in the paper to swell sufficiently to interfere with the printing process. In accordance with the invention, decreasing the amount of water by replacing it with suitable additives decreases the amount of wet cockle. The present invention discloses inks that employ such additives while maintaining the performance criteria needed for an ink-jet ink.

However, as the inventors have found, simply decreasing the amount of water is not sufficient to overcome the cockle problem. For example, replacing water with suitable solvents, such as organic compounds, and/or solid compounds, such as salts, requires finding the right combination of materials to minimize cockle without compromising performance. Solvents and/or salts that provide proper viscosities, do not prolong dry times, and have adequate print quality attributes are, among others, required.

Furthermore, simply decreasing weight percent of water in the ink, for example by 50%, does not significantly reduce wet cockle. The reason lies in the fact that even at 50 wt % water, the amount of water, in terms of mole fraction in a typical ink jet-ink, is still high, being about 0.8. Not until the mole fraction of water is reduced to about 0.5 or lower does the amount of wet cockle appearing on the paper during printing become reduced enough to prevent the printhead from crashing into the paper.

Figure 1:
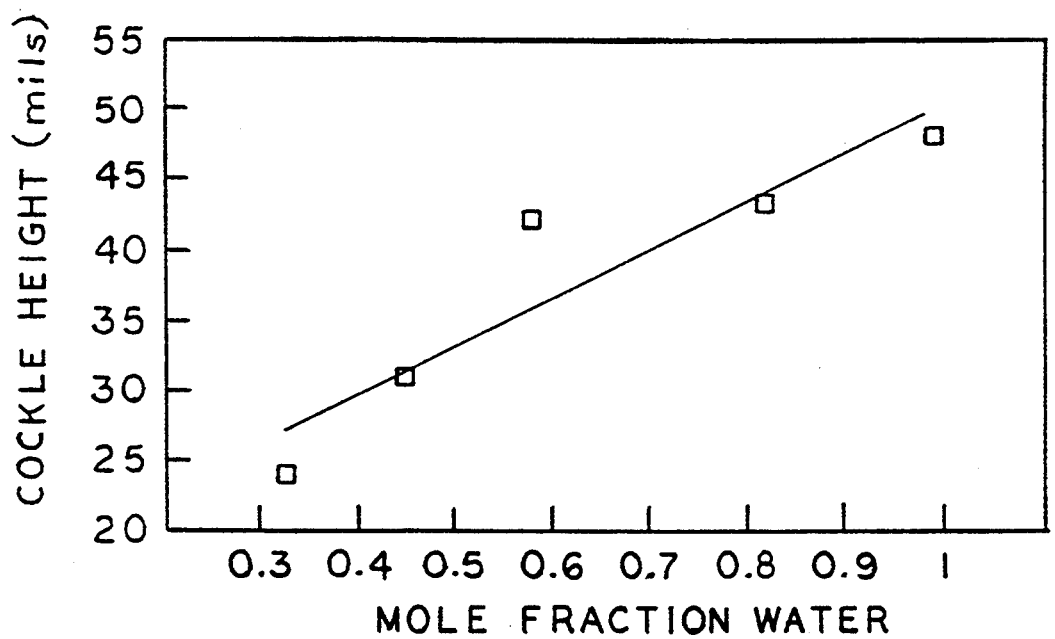
FIG. 1, on coordinates of cockle height (in mils) and mole fraction of water, is a plot of peak-to-peak cockle height in mils versus mole fraction of water.

In accordance with the invention, paper cockle is reduced by reducing the mole fraction of water to 0.5 or lower. FIG. 1 shows the effect of mole fraction of water in an ink-jet ink on cockle height. For comparison, the distance between the printhead and print medium (uncockled paper in that study) was 50 mils.

It should be noted that cockle height, as determined herein, was measured as a peak-to-peak amplitude of the cockle wave using a sensor attached to the print carriage of the printer. The plot clearly shows the dependence of cockle height versus mole fraction of water. Further, it is clear that the cockle height is dangerously close to 50 mils for inks having a mole fraction of water of greater than 0.5.

Figure 2:
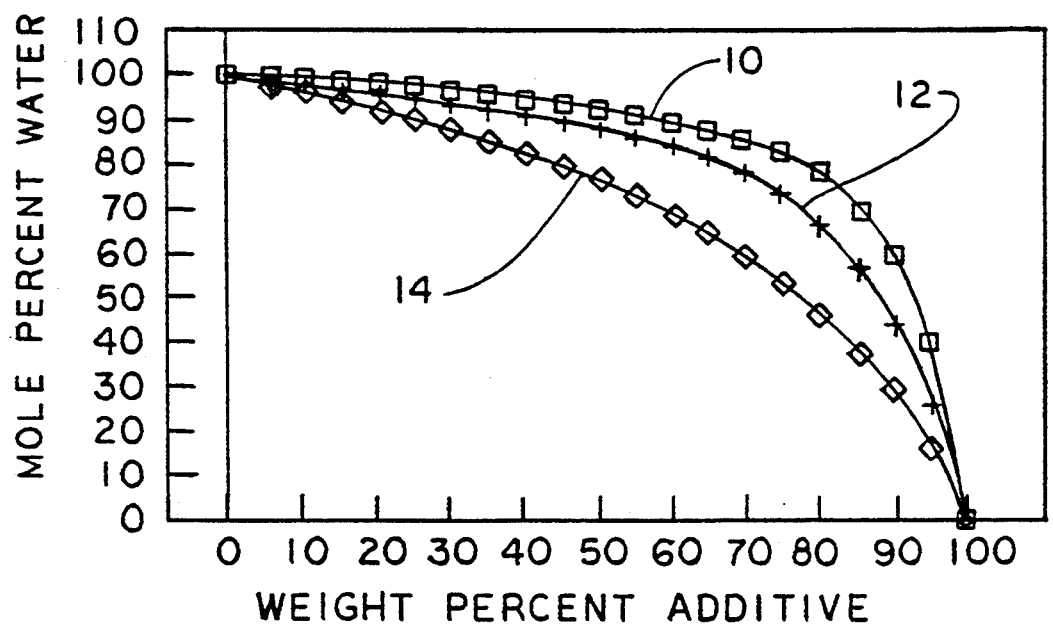
FIG. 2, on coordinates of mole percent of water and weight percent of additive, is a plot of the effect of various additives on water in varying amounts.

Reducing the mole fraction of water is done by adding one or more solvents and/or salts having a low molecular weight. By "low molecular weight" what is meant is a molecular weight of less than about 200 grams/mole. FIG. 2 shows the effect of various additives on the mole fraction of water in a two-component system, and illustrates the need to employ a low molecular weight substance, whether solvent or salt. In FIG. 2, Curve 10 represents $Ca(NO_3)_2.4H_2O$, having a molecular weight of 236; Curve 12 represents diethylene glycol, having a molecular weight of 106; and Curve 14 represents formamide, having a molecular weight of 45. Obviously, the lower the molecular weight of the additive, the less additive is needed.

The selection of a particular solvent and/or salt is a matter of choice, and depends on the level of print quality desired, total vapor pressure of the ink that can be tolerated, and other such factors. It is possible to combine one or more solvents with one or more salts to both reduce the mole fraction of water to less than 0.5 while still maintaining other desired ink properties. Based on the teachings herein, simple experimentation will be sufficient to determine the best combination of solvents and/or salts for a given application.

While a substance having a molecular weight of less than 200 grams/mole is useful in the practice of the present invention to reduce the molar fraction of water and hence reduce paper cockle, nevertheless, a substance having as low a molecular weight as possible is preferred, since such substances are more efficient in reducing the amount of wet cockle observed.

The additional benefit of employing as low a molecular weight substance as possible is that less of the substance will be needed, thereby minimizing compromising the performance of the pen and the ink. However, the substance cannot have so low a molecular weight that it is highly volatile. Accordingly, a balance must be made between the molecular weight of the substance and its boiling point. Consistent with these considerations, the boiling point of the substance should be similar or greater than the boiling point of water (100° C.).

Other considerations besides vapor pressure include whether the substance causes swelling of cellulose fibers in the paper or hydrogen bonds with the paper. Preferably, the substance does not cause appreciable swelling of the fibers and does not appreciably hydrogen bond with the paper.

Examples of suitable solvents that may be employed in the practice of the invention include ethylene glycol, diethylene glycol, 2-pyrrolidone, and formamide. Examples of suitable salts that may be employed in the practice of the invention include ammonium salts and nitrate salts, such as ammonium nitrate. Further, an example of a mixture of a solvent and a salt includes 2-pyrrolidone plus ammonium nitrate. It should be noted that this list is not intended to be exhaustive, but merely exemplary of solvents and/or salts that may be employed in the practice of the invention. The teachings of the present invention will enable those skilled in the art to select other useful solvents and/or salts without undue experimentation.

There are many substances having a molecular weight of less than 200 that have been taught in the prior art as being useful in thermal ink-jet inks for dealing with various aspects of ink-jet printing. These substance include solvents, humectants, anti-kogating agents, anti-cockle agents (which are intended to specifically reduce anti-cockle), and the like. However, to the best knowledge of the inventors, such substances have not been deliberately added in the prior art thermal ink-jet inks to a level sufficient to decrease the water content of the ink to less than 0.5 molar in an attempt to reduce paper cockle.

Further, it must be emphasized that the substance or substances added in accordance with the invention are not to be regarded as "anti-cockle agents" as such. It is simply the fact of lowering the molar fraction of water in the ink, using a low molecular weight substance, that reduces the cockle. Thus, there is no inherent advantage in using one type or class of compounds over another at reducing wet cockle. Rather, the advantage comes from using similar types of low molecular weight solvents and salts that have been previously used to formulate thermal ink-jet inks, but at concentration levels sufficient to reduce the molar fraction of the water in the ink to less than about 0.5.

Assuming no inherent advantage of one substance (solvent and/or salt) over another, the minimum amount of substance needed is approximately the amount of water present in the ink formulation, if the additive has a molecular weight similar to water. The higher the molecular weight of the substance, the more would be required. The maximum amount of the substance that can be tolerated in the ink is the amount would not cause any degradation of the pen and/or ink performance.

Thus, in selecting a particular solvent and/or salt, once a possible compound has been selected, it will have to be tested as to compatibility with the various materials comprising the ink and the pen. Such testing is not considered to constitute undue experimentation, as such tests are already commonly carried out in formulating new inks.

EXAMPLES

EXAMPLE 1

An experiment was carried out using a homologous series of glycols that illustrate the molecular weight effect. Ethylene glycol (MW: 62), diethylene glycol (MW: 106), triethylene glycol (MW: 150), and tetraethylene glycol (MW: 194) at concentrations from 40 to 80% by weight were incorporated into an ink-jet ink. After full blackout printing, it appeared (by visual examination) that ethylene glycol and diethylene glycol were much preferred over that of the tri- and tetra- forms, not only in cockle performance, but also in terms of the overall ink-jet performance.

EXAMPLE 2

Two similar studies as in Example 1 were also carried out, one with a series of lactams comprising 2-pyrrolidone (MW: 85), methyl-2-pyrrolidone (MW: 99), and 2-hydroxyethyl-2-pyrrolidone (MW: 129), and the other with a series of salts comprising ammonium nitrate (MW: 81), potassium nitrate (MW: 101), and calcium nitrate tetrahydrate (MW: 236). The most favorable lactam material appeared to be 2-pyrrolidone; the most favorable salt, ammonium nitrate. Again, in both instances, the lower molecular weight material gave the best results.

EXAMPLE 3

Based on the results of Example 2, a number of ink formulations containing up to 35 wt % 2-pyrrolidone and a number of ink formulations containing 25 to 50 wt % ammonium nitrate were prepared. The mole fraction of water of the highest concentration of additive in each case (35 wt % 2-pyrrolidone; 50 wt % ammonium nitrate) was approximately 0.5. The cockle height was reduced by at least 40% or more when printing full blackout as compared to an ink with a mole fraction of water of 0.8. In addition, the pen performance and overall ink output was compromised to only a small extent.

EXAMPLE 4

Figure 3:
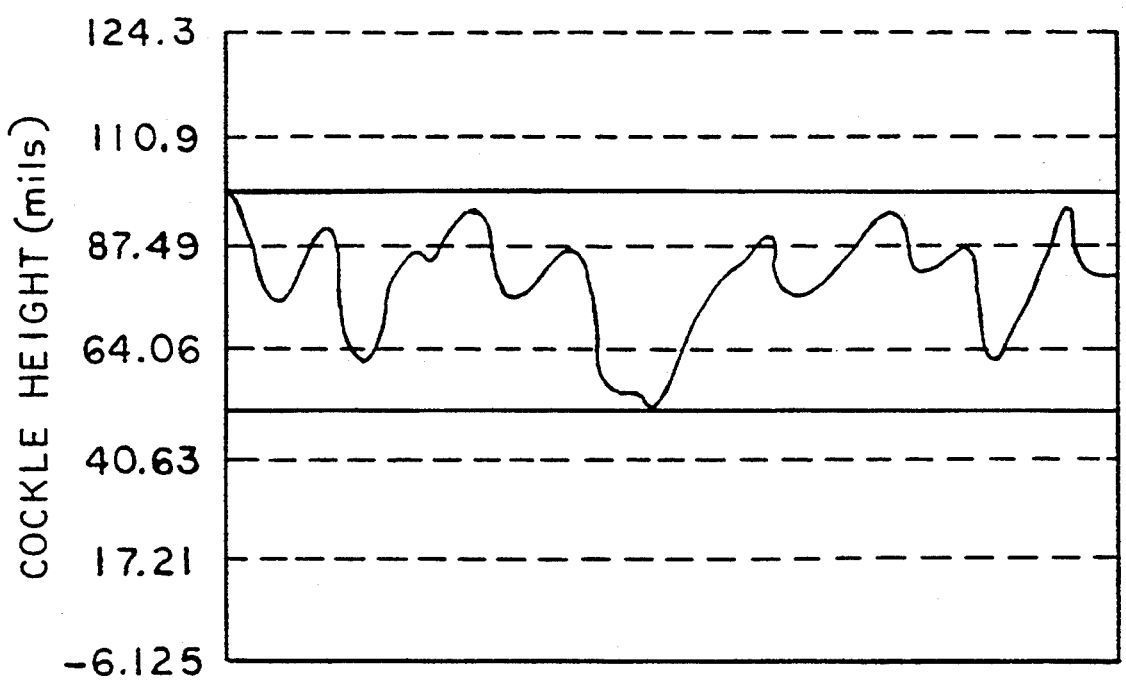
FIG. 3, on coordinates of cockle height (in mils) and displacement across the page, is a real-time plot of wet cockle height transverse to the printed page.

Four inks were formulated, two magenta and two cyan. One magenta ink and one cyan ink had a mole fraction of water of 0.95, while the other two inks had a mole fraction of 0.45. The mole fraction of water was reduced to 0.45 by employing a combination of 35 wt % 2-pyrrolidone and 30 wt % ammonium nitrate. The cockle height was determined by real time measurement of four pass printing of a 2.5 inch by 8 inch color block. FIG. 3 is a plot of cockle height output for the printed sample, and depicts the wave nature of cockle across the page. The cockle height was measured in mils and represents the average of five samples. The standard deviation is also given. The results are shown in Table I, below.

TABLE I

Cockle Height as a Function of Mole Fraction of Water in Ink.

| Ink | Color | Mole Fraction of $H_2O$ | Cockle Height, mils |
|---|---|---|---|
| RC1 | magenta | 0.95 | 58 ± 10 |
| CC1 | magenta | 0.45 | 39 ± 5 |
| RC2 | cyan | 0.95 | 57 ± 12 |
| CC2 | cyan | 0.45 | 34 ± 3 |

As can be seen from Table I, reducing the mole fraction of water resulted in a considerable reduction in cockle height.

INDUSTRIAL APPLICABILITY

The low water inks evidencing reduced cockle are expected to find use in thermal ink-jet printers.

Thus, there have been disclosed inks containing additives which reduce the mole fraction of water to less than 0.5, thereby providing lower paper cockle as a consequence. It will be appreciated by those skilled in this art that various changes and modifications of an obvious nature may be made, and all such changes and modifications are considered to fall within the scope of the present invention, as defined by the appended claims.

What is claimed is:

1. A method of reducing paper cockle on paper printed by a thermal ink-jet pen in a thermal ink-jet printer, said paper spaced from said pen by a distance, said method comprising formulating an ink including at least one substance having a molecular weight of less than 200 grams/mole in an amount sufficient to reduce the mole fraction of water to a value of less than about 0.5, thereby reducing said paper cockle to a value less than said distance between said paper and said pen.

2. The method of claim 1 wherein said at least one substance comprises a member selected from the group consisting of (a) at least one solvent having a molecular weight less than 200 grams/mole, (b) at least one salt having a molecular weight less than 200 grams/mole, and (c) at least one such solvent plus at least one such salt.

3. The method of claim 2 wherein said at least one solvent is selected from the group consisting of ethylene glycol, diethylene glycol, 2-pyrrolidone, and formamide.

4. The method of claim 2 wherein said at least one salt is selected from the group consisting of ammonium salts and nitrate salts.

5. The method of claim 4 wherein said at least one salt consists essentially of ammonium nitrate.

6. The method of claim 2 wherein said substance comprises one solvent plus one salt.

7. The method of claim 6 wherein said solvent consists essentially of 2-pyrrolidone and said salt consists essentially of ammonium nitrate.

8. The method of claim 7 wherein said solvent consists essentially of 35 wt % of 2-pyrrolidone and said salt consists essentially of 30 wt % of ammonium nitrate.

9. An aqueous-based ink-jet ink for thermal ink-jet printers comprising a pen for jetting ink therefrom onto paper spaced a distance from said pen, said ink-jet ink including at least one substance having a molecular weight of less than 200 grams/mole and present in an amount sufficient to reduce the mole fraction of water to a value of less than about 0.5, thereby affording paper cockle that is less than said distance between said pen and said paper.

10. The ink-jet ink of claim 1 wherein said at least one substance comprises a member selected from the group consisting of (a) at least one solvent having a molecular weight less than 200 grams/mole, (b) at least one salt having a molecular weight less than 200 grams/mole, and (c) at least one such solvent plus at least one such salt.

11. The ink-jet ink of claim 10 wherein said at least one solvent is selected from the group consisting of ethylene glycol, diethylene glycol, 2-pyrrolidone, and formamide.

12. The ink-jet ink of claim 10 wherein said at least one salt is selected from the group consisting of ammonium salts and nitrate salts.

13. The ink-jet ink of claim 12 wherein said at least one salt consists essentially of ammonium nitrate.

14. The ink-jet ink of claim 10 wherein said substance comprises one said solvent plus one said salt.

15. The ink-jet ink of claim 14 wherein said solvent consists essentially of 2-pyrrolidone and said salt consists essentially of ammonium nitrate.

16. The ink-jet ink of claim 15 wherein said solvent consists essentially of 35 wt % of 2-pyrrolidone and said salt consists essentially of 30 wt % of ammonium nitrate.

* * * * *